Jan 6, 1931.  H. E. WILLIAMS  1,787,847
AWNING
Filed March 9, 1928
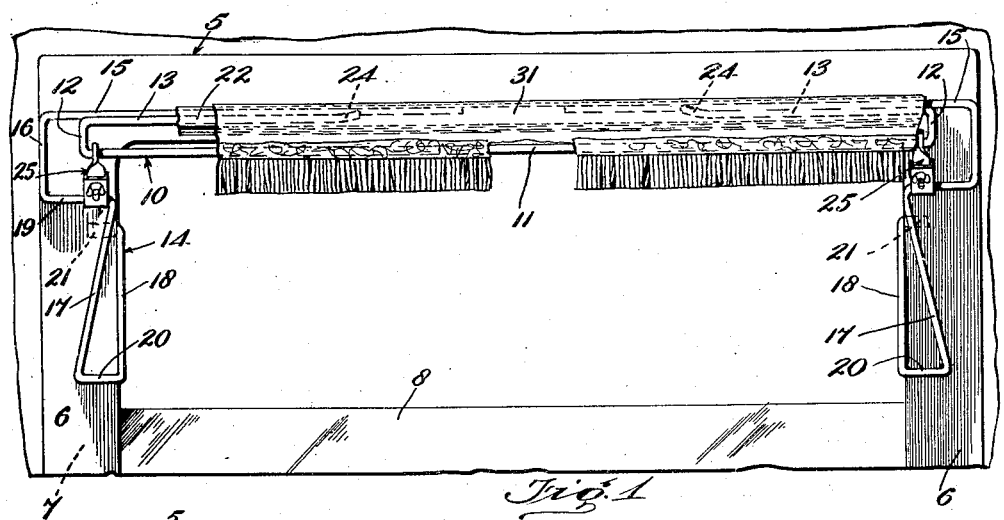
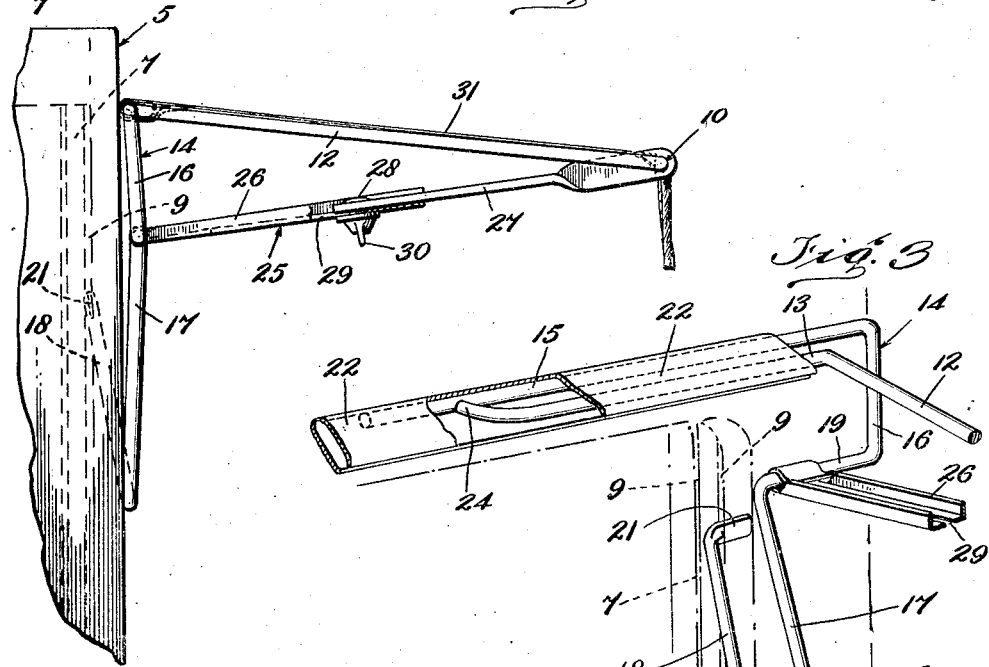
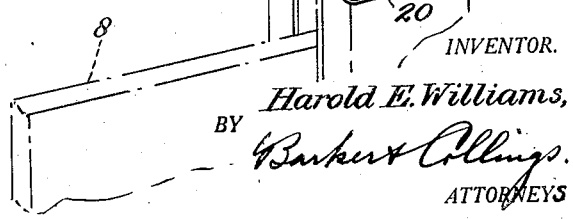
INVENTOR.
Harold E. Williams,
BY
ATTORNEYS Patented Jan. 6, 1931

1,787,847

UNITED STATES PATENT OFFICE

HAROLD E. WILLIAMS, OF CARTHAGE, MISSOURI

AWNING

Application filed March 9, 1928. Serial No. 260,359.

This invention relates to awnings for the windows of automobile doors and has for one of its objects to provide a device of this character which will be simple in construction, comparatively inexpensive to manufacture and more efficient in use than those which have been heretofore proposed.

A further object of the invention is to provide an improved means for securing the awning to the door frame, which embodies resilient supporting members which are adapted to readily detachably engage the door stiles and to support the awning frame in position through yielding force or clamping action applied transversely of the said stiles.

A still further object of the invention is to provide an awning of the type described having a frame to which the supporting members are slidably and pivotally connected, certain portions of the frame being distorted in order that they may frictionally engage portions of the supporting members to maintain them in adjusted positions.

With the above and other objects in view which will appear as the description proceeds, the invention consists in the novel details of construction and combinations and arrangements of parts more fully hereinafter described and particularly pointed out in the appended claims.

Referring to the accompanying drawing forming a part of this specification, in which like reference characters designate like parts in all the views:

Fig. 1 is a fragmentary side elevational view of an automobile door with an awning constructed in accordance with the present invention in place thereon.

Fig. 2 is a fragmentary end elevational view of the door and awning shown in Fig. 1, a portion of the latter being broken away, and Fig. 3 is a fragmentary perspective view of the awning frame and one of the supporting members, illustrating certain of the details of construction.

Referring more particularly to the said drawings, 5 indicates generally an automobile door having the vertical stiles 6 provided with the usual glass runs 7 in which the window glass 8 slides. The glass runs, as is usual in this type of construction, are provided with the felt or other cushioning members or channels 9.

The awning comprising the present invention includes a substantially rectangular frame 10 which may be formed of metallic wire or a rod and which is bent to substantially rectangular shape to provide a front bar 11 and side bars 12, the extreme ends 13 of which are inturned toward one another in a plane substantially parallel to the front bar 11, as will be clear from the drawings.

The supporting members for the awning frame are designated generally by numeral 14 and comprise wires or rods bent substantially as illustrated in Figs. 1 and 3 to provide end portions 15, vertical portions 16, 17 and 18, and horizontal portions 19, 20 and 21. The end portions 15 of the members 14 are positioned adjacent to and substantially parallel with the inturned ends 13 of the frame member 10, as will be clear from the drawings, and these parallel portions are embraced by a substantially tubular hinge member 22 which serves to pivotally and slidably connect the supporting members to the frame. That is to say the end portions 15 of the supporting members 14 are free to rotate about their axes in the sleeve or tubular hinge member 22 and they are also free to slide longitudinally therein whereby it is possible to adjust the said members to doors of various widths, as will be readily understood.

In order to place a check upon the sliding and rotary movements of the supporting members 14 the extreme tips of the inturned ends 13 of the frame 10 are preferably bent slightly, as indicated at 24, so that the said tips are brought into frictional engagement with the surface of the end portions 15 of the supporting members. This frictional engagement is such that it will, under ordinary operating conditions, serve to prevent movement especially in a longitudinal direction, of the supporting members 14, while, at the same time, it will permit of said members being moved through the exertion of manually applied force for purposes of adjustment to an automobile door.

As will be especially clear from Fig. 2, the vertical portions 18 of the supporting members 14 are distorted out of the plane of the portions 17 of the said members to the end that the extreme tips 21 may be introduced into the glass run of the vehicle door preferably intermediate the felt packing and the outer face of the said run. The said tips 21 are preferably flattened as clearly shown in the drawings, so that they may freely enter between the felt and the base of the run and permit the free sliding of the glass in the run so that the latter may be raised to its uppermost limits when desired. The supporting members being formed of resilient material they will exert a clamping action on the door stiles in a transverse direction with the horizontal portions 20 and the hinge member 22 engaging the face of the door and acting inwardly while the extreme tips 21 engage the outer face of the glass run and exert force outwardly as will be readily understood.

Brace members 25 are provided between the frame 10 and the supporting members 14 comprising longitudinally aligned brace members 26 and 27 which are pivotally secured respectively to the horizontal portion 19 of the supporting members and to the front bar 11 of the frame, as will be clear from the drawings. The said members 26 and 27 are adjustably connected through the medium of a bolt 28 working in a slot 29, said bolt being provided with a suitable wing nut 30 for clamping the same. A suitable cover 31 is secured to the rectangular frame 10, as is well known in the art.

In mounting the awning upon an automobile door the supporting members 14 are adjusted laterally to substantially the width of the window opening, the awning is placed in position upon the outside of the door and the vertical portions 18 of the supporting members are sprung inwardly to permit their flattened tips to be engaged between the felt packing and the face of the glass run. The resilience of the supporting members will then cause them to grip the door stiles with a force acting transversely to said stiles which will serve to rigidly support the awning in position upon the door, as will be readily understood. The awning frame itself may be angularly adjusted relative to the supporting members by loosening the clamping nuts 30 of the brace members and adjusting the length of the said braces to produce any desired degree of angularity of the frame 10. Thereupon the said nuts are again tightened.

While one form of the invention has been illustrated and described it is obvious that those skilled in the art may vary the details of construction, as well as the precise arrangement of parts, without departing from the spirit of the invention, and therefore it is not wished to be limited to the above disclosure except as may be required by the claims.

What I claim is:

1. An awning for the windows of automobile doors, comprising a frame and a cover therefor; and supporting members comprising bent resilient rods slidably and pivotally carried by said frame, said rods having portions for engaging the face of the door stile, and flattened inturned ends for engaging in the glass run of the door between the glass packing and the face of the run parallel to and adjacent the face of the stile.

2. In an awning for the windows of automobile doors, a substantially rectangular frame comprising a rod bent to form a front bar and side bars, the ends of said side bars being inturned toward one another in a plane substantially parallel to said front bar; supporting members for said frame having portions adjacent to and substantially parallel to said inturned ends; and a hinge member embracing said inturned ends and the adjacent portions of said supporting members, to slidably and pivotally connect the latter to the former, portions of said inturned ends of said frame member being distorted to frictionally engage said supporting members.

3. An awning adapted to be applied to the window opening of an automobile, comprising two independent supporting frame members, each adapted to engage resiliently and by a transverse clamping action with the side frame of a window opening, the intermediate portions of the said supporting frame members resting against the outside of the window frame adjacent to the upper corners of the window opening; a connecting hinge member between and uniting the said supporting frame members, and an awning frame pivotally united with the said connecting hinge member.

4. An awning such as described in claim 3 wherein the supporting frame members are laterally adjustable relative to the connecting hinge member, adapting them to engage with the side frames of window openings of different sizes.

5. An awning adapted to be applied to a frame surrounding a window opening of an automobile, comprising supporting members having engagement with the glass runs of the window frame and arranged to bear on the outside of the window frame adjacent to the upper corners of the window opening, said supporting members being constructed to have inturned end portions, and intermediate cross pieces exterior to the frame and substantially parallel with the said inturned end pieces; a tubular member with which the supporting side members have pivotal and transversely adjustable connections; a stretcher frame upon which is supported an awning fabric, having pivotal connection with the said tubular member along its rear edge, and extensible intermediate braces between the intermediate portions of the supporting members and the outer parts of the stretcher frame, whereby the stretcher is held extended and in desired position.

6. An awning for use in connection with a window opening of an automobile, comprising a stretcher frame having outer and inner cross pieces, and a cover on the frame; supporting side members formed of resilient metal, each shaped to have an inturned upper end adapted to approximately parallel the inner cross members of the stretcher frame, a lower end adapted to enter a glass run formed in the window frame to hold the supporting member in position, and an intermediate portion between the said end parts arranged to bear on the outside of the window frame adjacent to an upper corner of the window opening, the intermediate portion having a horizontal part; a tubular member enclosing the inturned ends of the stretcher frame and the upper end portions of the supporting members, whereby these parts are pivotally and transversely adjustably connected; and extensible braces between the intermediate horizontal portions of the supporting members and the outer cross member of the stretcher frame, whereby the latter is held extended and in desired position.

HAROLD E. WILLIAMS.